(12) United States Patent
Wrighton

(10) Patent No.: US 11,152,831 B2
(45) Date of Patent: Oct. 19, 2021

(54) POLYGONAL LINER FOR ELECTRICAL SUBMERSIBLE PUMP CANNED MOTOR

(71) Applicant: Saudi Arabian Oil Company, Dhahran (SA)

(72) Inventor: Christopher Wrighton, Aberdeenshire (GB)

(73) Assignee: SAUDI ARABIAN OIL COMPANY, Dhahran (SA)

(*) Notice: Subject to any disclaimer, the term of this patent is extended or adjusted under 35 U.S.C. 154(b) by 308 days.

(21) Appl. No.: 16/287,495

(22) Filed: Feb. 27, 2019

(65) Prior Publication Data

US 2020/0274416 A1   Aug. 27, 2020

(51) Int. Cl.

| | |
|---|---|
| *F04D 13/10* | (2006.01) |
| *H02K 5/10* | (2006.01) |
| *E21B 43/12* | (2006.01) |
| *F04B 17/03* | (2006.01) |
| *F16C 17/02* | (2006.01) |

(Continued)

(52) U.S. Cl.
CPC ............ *H02K 5/10* (2013.01); *E21B 43/128* (2013.01); *F04B 17/03* (2013.01); *F04D 13/0626* (2013.01); *F04D 13/10* (2013.01); *F16C 17/02* (2013.01); *H02K 5/1282* (2013.01); *H02K 5/132* (2013.01); *H02K 5/1737* (2013.01); *F04B 15/02* (2013.01); *F16C 2360/00* (2013.01)

(58) Field of Classification Search
CPC ......... F04D 13/10; F04D 13/0606–064; F04D 13/0626; F04D 13/0633; F04D 13/08; F04D 25/0686; H02K 5/1282–1285

USPC ... 417/423.3, 423.7, 423.11, 423.12, 423.14, 417/424.1

See application file for complete search history.

(56) References Cited

U.S. PATENT DOCUMENTS 2,722,892 A * 11/1955 French ................. H02K 5/1285
 417/423.3
3,116,696 A *  1/1964 Deters ..................... F04D 13/10
 415/140

(Continued)

FOREIGN PATENT DOCUMENTS

| CN | 282745 Y | 5/1998 |
|---|---|---|
| CN | 201038872 Y | 3/2008 |

OTHER PUBLICATIONS

International Search Report and Written Opinion for related PCT application PCT/US2020/020041 dated May 25, 2020.

*Primary Examiner* — Devon C Kramer
*Assistant Examiner* — Thomas Fink
(74) *Attorney, Agent, or Firm* — Bracewell LLP; Constance G. Rhebergen; Linda L. Morgan

(57) ABSTRACT

Systems and methods for producing hydrocarbons from a subterranean well include an electrical submersible pump assembly with a motor. The motor has a motor housing and a stator is located within the motor housing. The stator has a stator body with an interior cavity. A rotor assembly is located within the interior cavity of the stator. The rotor assembly includes a rotor shaft, a rotor member, and an intermediate rotor bearing assembly. The rotor member and the intermediate rotor bearing assembly circumscribe the rotor shaft. The rotor shaft extends along the central axis of the stator. A liner is located along an interior surface of the interior cavity, the liner being a thin walled member that is secured to the motor housing and seals the stator body from a wellbore fluid. The liner has a polygonal cross section.

15 Claims, 3 Drawing Sheets

(51) Int. Cl.
    *H02K 5/132*     (2006.01)
    *H02K 5/173*     (2006.01)
    *F04D 13/06*     (2006.01)
    *H02K 5/128*     (2006.01)
    *F04B 15/02*     (2006.01)

(56) References Cited

U.S. PATENT DOCUMENTS

| | | | |
|---|---|---|---|
| 3,457,866 A * | 7/1969 | Komor | F04D 13/10 |
| | | | 417/422 |
| 4,019,836 A * | 4/1977 | Deters | F04D 13/10 |
| | | | 417/360 |
| 4,780,953 A * | 11/1988 | Wheeler | H02K 5/1285 |
| | | | 29/525 |
| 5,348,452 A | 9/1994 | Yamamoto et al. | |
| 5,923,111 A * | 7/1999 | Eno | E21B 43/128 |
| | | | 310/156.25 |
| 6,309,188 B1 * | 10/2001 | Danner | F04D 29/0413 |
| | | | 310/87 |
| 8,629,592 B2 | 1/2014 | Johnson et al. | |
| 9,577,494 B2 | 2/2017 | Mei et al. | |
| 9,702,370 B2 * | 7/2017 | Kalavsky | H02K 7/08 |
| 2005/0036895 A1 | 2/2005 | Tremain et al. | |
| 2010/0038142 A1 | 2/2010 | Snyder et al. | |
| 2013/0207492 A1 | 8/2013 | Chamberlin et al. | |
| 2014/0079575 A1 * | 3/2014 | Forsberg | F04D 29/041 |
| | | | 417/423.3 |
| 2017/0264158 A1 | 9/2017 | Li et al. | |
| 2017/0264179 A1 | 9/2017 | Khotsyanov et al. | |
| 2018/0179872 A1 | 6/2018 | Filatov et al. | |
| 2018/0363660 A1 | 12/2018 | Klahn | |
| 2019/0032459 A1 | 1/2019 | Pires et al. | |

\* cited by examiner

POLYGONAL LINER FOR ELECTRICAL SUBMERSIBLE PUMP CANNED MOTOR

BACKGROUND OF THE DISCLOSURE

1. Field of the Disclosure

The disclosure relates generally to subterranean well development operations and in particular, to electrical submersible pump assemblies with canned motors.

2. Description of the Related Art

One method of producing hydrocarbon fluid from a well bore that lacks sufficient internal pressure for natural production is to utilize an artificial lift method such as an electrical submersible pump. A string of tubing or pipe known as a production string suspends the submersible pumping device near the bottom of the well bore proximate to the producing formation. The submersible pumping device is operable to retrieve production zone fluid, impart a higher pressure into the fluid and discharge the pressurized production zone fluid into production tubing. Pressurized well bore fluid rises towards the surface motivated by difference in pressure. Electrical submersible pumps can be useful, for example, in high gas to oil ratio operations and in aged fields where there is a loss of energy and the hydrocarbons can no longer reach the surface naturally.

Some current electrical submersible pump assemblies have an electric motor with a rotor and stator. In such motors, corrosive fluids, such as hydrogen sulfide, may enter the space between the rotor and the stator damaging the stator components.

SUMMARY OF THE DISCLOSURE

Some current motors of electric submersible pump systems utilize seals to prevent wellbore and other fluids from entering the stator body. However, such seals are prone to leaks during handling of the electrical submersible pump system, in particular when the motor has a length that is significantly longer than the diameter, enabling the motor to bend and otherwise deform during handling. Embodiments disclosed herein provide systems and methods for hermetically isolating a stator body from wellbore fluids.

Systems and methods of this disclosure provide a liner that can be secured at each end of the stator in a manner that prevents leaks, such as by welding. Sealing the stator will extend the useful life of the motor compared to motors that allow fluids to enter the stator body. The liner can have a polygonal cross section that allows the rotor assembly to easily be pulled into the stator and prevents relative rotation between the rotor bearings and the stator.

In an embodiment of this disclosure a system for producing hydrocarbons from a subterranean well includes an electrical submersible pump assembly with a motor. The motor has a motor housing. The motor housing is an elongated member. A stator is located within the motor housing. The stator has a stator body with an interior cavity extending along a central axis of the stator. A rotor assembly is located within the interior cavity of the stator. The rotor assembly includes a rotor shaft, a rotor member, and an intermediate rotor bearing assembly. The rotor member and the intermediate rotor bearing assembly circumscribe the rotor shaft. The rotor shaft is an elongated member that extends along the central axis of the stator. A liner is located along an interior surface of the interior cavity. The liner is a thin walled member that is secured to the motor housing and seals the stator body from a wellbore fluid. The liner has a polygonal cross section.

In alternate embodiments, the intermediate rotor bearing assembly can be a ring shaped member with a polygonal shaped outer series of edges that corresponds to the polygonal cross section of the liner. The intermediate rotor bearing assembly can have a radial bearing having an inner diameter shape that corresponds to an outer diameter shape of the rotor shaft. The intermediate rotor bearing assembly can be rotationally static relative to the stator and the rotor shaft can rotate relative to the intermediate rotor bearing assembly.

In other alternate embodiments, the liner can be formed of a non-magnetic material. The liner can be welded at an uphole end of the motor and can be welded at a downhole end of the motor. The motor can have an axial length in a range of 0.05 to 10 meters and can have an outer diameter in a range of 0.025 to 1 meters.

In another embodiment of this disclosure, a method for producing hydrocarbons from a subterranean well includes providing an electrical submersible pump assembly with a motor, a seal section, and a pump. The motor has a motor housing, the motor housing being an elongated member. A stator is located within the motor housing. The stator has a stator body with an interior cavity extending along a central axis of the stator. A rotor assembly is located within the interior cavity of the stator. The rotor assembly includes a rotor shaft, a rotor member, and an intermediate rotor bearing assembly. The rotor member and the intermediate rotor bearing assembly circumscribe the rotor shaft. The rotor shaft is an elongated member that extends along the central axis of the stator. A liner is located along an interior surface of the interior cavity. The liner is a thin walled member that is secured to the motor housing and seals the stator body from a wellbore fluid. The liner has a polygonal cross section. The electrical submersible pump assembly is lowered into the subterranean well with a deployment string. The electrical submersible pump assembly is operated to lift production fluids in a direction out of the subterranean well.

In alternate embodiments the method can further include providing the intermediate rotor bearing assembly that is a ring shaped member with a polygonal shaped outer series of edges that corresponds to the polygonal cross section of the liner and with a radial bearing having an inner diameter shape that corresponds to an outer diameter shape of the rotor shaft. Operating the electrical submersible pump assembly can include rotating the rotor shaft. The rotor shaft can rotate relative to the intermediate rotor bearing assembly and the intermediate rotor bearing assembly can be rotationally static relative to the stator.

In other alternate embodiments, the liner can be formed of a non-magnetic material. The liner can be welded at an uphole end of the motor and can be welded at a downhole end of the motor. The motor can have an axial length in a range of 0.05 to 10 meters and has an outer diameter in a range of 0.025 to 1 meters.

In yet another alternate embodiment of this disclosure, a method for producing hydrocarbons from a subterranean well includes forming a rotor assembly by positioning an intermediate rotor bearing assembly and a rotor member onto a rotor shaft so that the rotor member and the intermediate rotor bearing assembly circumscribe the rotor shaft, where the rotor shaft is an elongated member. The rotor assembly is pulled into an interior cavity of a stator body within a motor housing. The motor housing is an elongated member and the stator body is part of a stator. The rotor shaft extends along a central axis of the stator. A liner is located along an interior surface of the interior cavity. The liner is a thin walled member that is secured to the motor housing and seals the stator body from a wellbore fluid. The liner has a polygonal cross section. The motor housing, the stator, the rotor assembly, and the liner form a motor. An electrical submersible pump assembly is formed with the motor, a seal section, and a pump. The electrical submersible pump assembly is lowered into the subterranean well with a deployment string. The electrical submersible pump assembly is operated to lift production fluids in a direction out of the subterranean well.

In alternate embodiments, the method can further include providing the intermediate rotor bearing assembly that is a ring shaped member with a polygonal shaped series of edges that corresponds to the polygonal cross section of the liner and with a radial bearing having an inner diameter shape that corresponds to an outer diameter shape of the rotor shaft. Operating the electrical submersible pump assembly can include rotating the rotor shaft. The rotor shaft can rotate relative to the intermediate rotor bearing assembly and the intermediate rotor bearing assembly can be rotationally static relative to the stator.

In other alternate embodiments the liner can be formed of a non-magnetic material. The liner can be welded at an uphole end of the motor and can be welded at a downhole end of the motor. The motor can have an axial length in a range of 0.05 to 10 meters and can have an outer diameter in a range of 0.025 to 1 meters.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
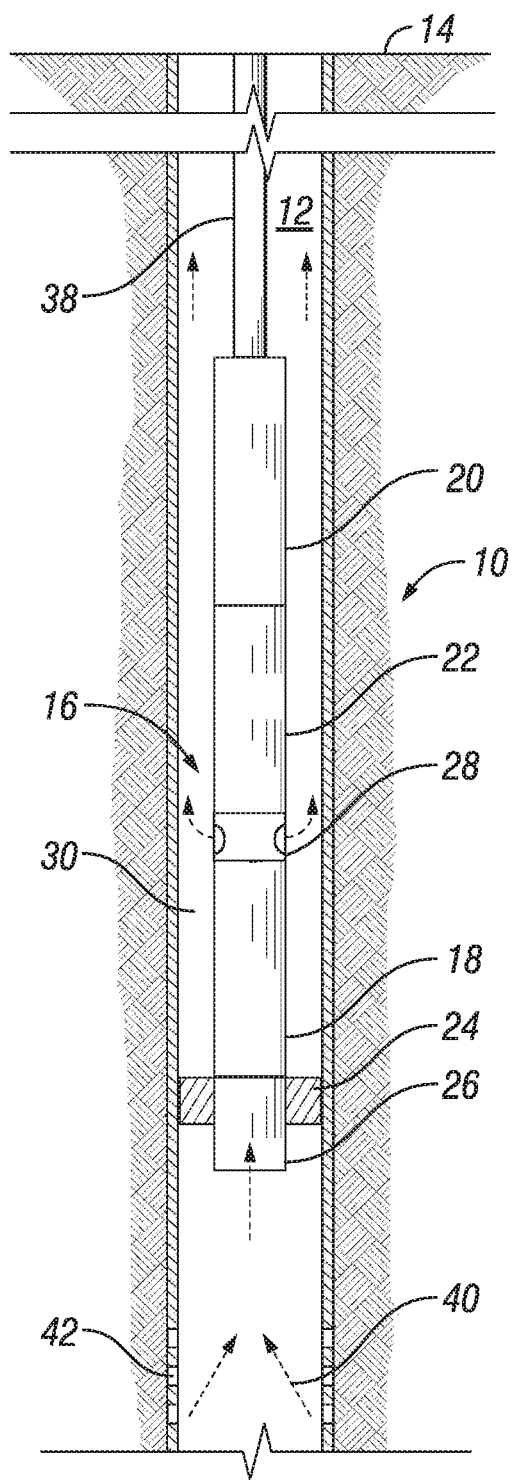
FIG. 1 is a section view of a subterranean well having an electrical submersible pump assembly, in accordance with an embodiment of this disclosure.

Looking at FIG. 1, subterranean well 10 can have wellbore 12 that extends to an earth's surface 14. Subterranean well 10 can be an offshore well or a land based well and can be used for producing fluids, such as producing hydrocarbons from subterranean hydrocarbon reservoirs. Electrical submersible pump assembly 16 can be located within wellbore 12. Electrical submersible pump assembly 16 can provide artificial lift to production fluids. Electrical submersible pump assembly 16 can include pump 18 and motor 20.

Pump 18 can be, for example, a rotary pump such as a centrifugal pump. Pump 18 could alternatively be a progressing cavity pump, which has a helical rotor that rotates within an elastomeric stator or other type of pump known in the art for use with an electrical submersible pump assembly. Pump 18 can consist of stages, which are made up of impellers and diffusers. The impeller, which is rotating, adds energy to the fluid to provide head and the diffuser, which is stationary, converts the kinetic energy of fluid from the impeller into potential energy (head). The pump stages can be stacked in series to form a multi-stage system that is contained within a pump housing. The sum of head generated by each individual stage is summative so that the total head developed by the multi-stage system increases linearly from the first to the last stage.

Pump 18 is located within wellbore 12 and is oriented to selectively boost the pressure of the production fluids traveling from the wellbore towards the earth's surface 14 so that production fluids can travel more efficiently to the earth's surface 14 through wellbore 12.

Motor 20 is also located within wellbore 12 and provides power to pump 18. Electrical submersible pump assembly 16 can include seal section 22. Seal section 22 can be located between pump 18 and motor 20. Seal section 22 can absorb the thrust load from pump 18, transmits power from motor 20 to pump 18, and equalizes pressure with the well while motor dielectric oil expands and contracts during operation preventing wellbore fluid from entering motor 20. Wellbore fluid can include production fluids, motor oil, treatment fluids, and other fluids utilized in subterranean development operations. In the example embodiment of FIG. 1, electrical submersible pump assembly 16 is shown with seal section 22. In alternate embodiments, electrical submersible pump assembly 16 does not include seal section 22. Instead, motor 20 can drive pump 18 without a seal section or protector located between motor 20 and pump 18. In such an embodiment wellbore fluids can pass through the rotor cavity, lubricating the rotor bearings and cooling the inner diameter of the stator.

Downhole packer 24 can be located within wellbore 12 and be used to isolate the section of wellbore 12 that is downhole of downhole packer 24 from the section of wellbore 12 that contains electrical submersible pump assembly 16. Downhole packer 24 can seal around the inner diameter surface of wellbore 12 and can circumscribe stinger 26. Downhole packer 24 can be, for example, a polished bore receptacle type of packer, allowing bypass stinger 26 to sting in so that stinger 26 extends through downhole packer 24.

Electrical submersible pump assembly 16 can further include discharge 28 that is located between pump 18 and seal section 22. Discharge 28 can direct fluid that has passed through pump 18 into annular space 30 between an outer diameter surface of electrical submersible pump assembly 16 and an inner diameter of wellbore 12. Fluid within annular space 30 uphole of downhole packer 24 can be delivered to the surface by way of annular space 30.

Electrical submersible pump assembly 16 can be conventionally, cable or power coil deployed. Electrical submersible pump assembly 16 can be lowered into wellbore 12 with deployment string 38. Deployment string 38 can be, for example, coiled tubing, a wireline, or a cable. Deployment string 38 can support electrical submersible pump assembly 16 within wellbore 12. In embodiments where deployment string 38 is coiled tubing, production fluids can travel to earth's surface 14 through the coiled tubing.

As indicated by arrows 40, reservoir fluids will travel from perforations 42 that are downhole of downhole packer 24 and into stinger 26 to pass by downhole packer 24. The reservoir fluids can travel through pump 18. Discharge 28 directs the production fluid out of pump 18 and into annular space 30. The production fluid continues to travel in an uphole direction past seal section 22 and motor 20 to be produced to the surface and treated and processed using conventional methods.

FIG. 1 provides an example embodiment of electrical submersible pump assembly 16. In the example configuration of FIG. 1 electrical submersible pump assembly 16 is shown as an inverted assembly with motor 20 uphole of pump 18. In alternate embodiments, the arrangement of each of the components of electrical submersible pump assembly 16 could be differently configured. As an example, electrical submersible pump assembly 16 can be conventional assembly with pump 18 located uphole of motor 20. Alternately, pump 18 can be integrated with motor 20. In other alternate embodiments, there may be no packers, or there can be more than one packer.

Figure 2:
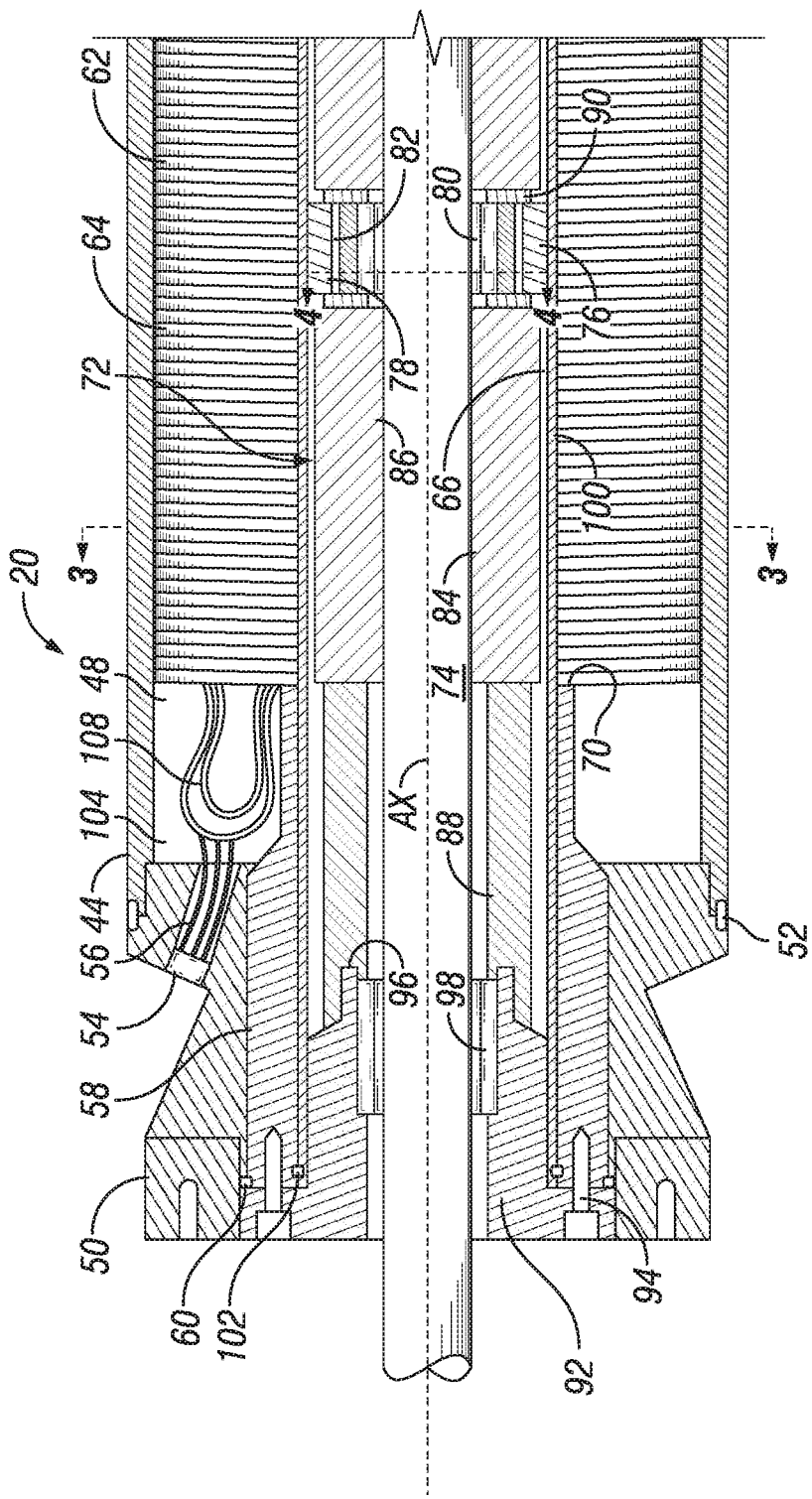
FIG. 2 is a section view of an electrical submersible pump motor, in accordance with an embodiment of this disclosure.

Looking at FIG. 2, motor 20 is an electric motor. Motor 20 can be a long and skinny motor. As used in this disclosure, a long motor is considered to be a motor with an axial length in a range of 0.05 to 10 meters. As used in this disclosure, a skinny motor is considered to be a motor with an outer diameter in a range of 0.025 to 1 meters.

Motor 20 includes motor housing 44. Motor housing 44 is an elongated tubular member that encloses the internal components of motor 20. Motor housing 44 has inner bore 48 and can be open at both an uphole and downhole end. FIG. 2 illustrates a configuration of an axial length of motor 20, the end of which could be the uphole end or the downhole end of motor 20.

Head member 50 can be connected to each of the open ends of motor housing 44. Head member 50 can be a ring shaped member. A portion of head member 50 can be located within motor housing 44 and another portion of head member 50 can protrude outside of motor housing 44. An outer diameter surface of head member 50 is connected to motor housing 44 in a manner that prevents fluids from passing into the inner bore of motor housing 44 by traveling between head member 50 and motor housing 44. In the example embodiment of FIG. 2, head member 50 is welded to motor housing 44 with weld 52. In alternate embodiments, head member 50 can be connected to motor housing 44 in another manner that sealingly secures head member 50 to motor housing 44 such as, for example, with adhesive.

Head member 50 can include pothead 54. Pothead 54 can be an insulated electrical terminal for connecting a power cable to motor tails 56 within motor housing 44. Electrical power can then be provided to motor 20 by way of the power cable and motor tails 56.

Backup ring 58 can be connected to an inner diameter surface of head member 50. Backup ring 58 can be a ring shaped member. A portion of backup ring 58 can be located within motor housing 44 and another portion of backup ring 58 can protrude outside of motor housing 44. An outer diameter surface of backup ring 58 is connected to head member 50 in a manner that prevents fluids from passing into the inner bore of motor housing 44 by traveling between backup ring 58 and head member 50. In the example embodiment of FIG. 2, backup ring 58 is welded to head member 50 with weld 60. In alternate embodiments, backup ring 58 can be connected to head member 50 in another manner known in the art that sealingly secures backup ring 58 to head member 50 such as, for example, with adhesive.

Stator 62 is located within motor housing 44. During operation of motor 20 stator 62 is static relative to motor housing 44. Stator 62 includes stator body 64 that is a generally ring shaped member formed of stator laminations. The stator laminations of stator body 64 can be thin steel sheets of shaped discs that are stacked together to form the axial length of stator body 64. The sheets of the lamination can be unbonded to each other or can be bonded together.

Stator body 64 can have interior cavity 66. Interior cavity 66 extends along central axis Ax of stator 62. Looking at FIG. 3, stator body 64 further includes winding slots 68. Winding slots 68 extend through the axial length of stator body 64. Stator 62 further includes stator windings that are contained within winding slots 68. The stator windings are formed of a number of wires that are wound through winding slots 68 and around stator body 64.

Looking at FIG. 2, backup ring 58 can have internal end 70 that retains stator body 64 within motor housing 44. Rotor assembly 72 is located within interior cavity of 66 of stator 62. Rotor assembly 72 include rotor shaft 74. Rotor shaft 74 is an elongated member that extends through motor 20 along central axis Ax. During operation of motor 20, rotor shaft 74 rotates within motor housing 44. In embodiments where pump 18 is integrated with motor 20, rotor assembly 72 can include vanes. The vanes rotate with rotor shaft 74 and can pump the production fluids to the earth's surface 14 through wellbore 12. In such an embodiment a separate pump 18 is not included in electrical submersible pump assembly 16.

Figure 4:
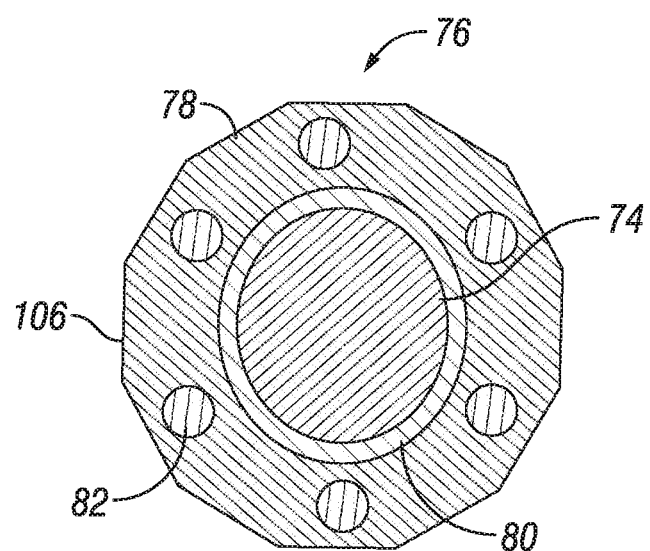
FIG. 4 is a cross section view along B-B of the electrical submersible pump assembly of FIG. 2.

Rotor assembly 72 further includes intermediate rotor bearing assembly 76. Intermediate rotor bearing assembly 76 is a ring shaped member and circumscribes rotor shaft 74. During operation of motor 20 intermediate rotor bearing assembly 76 can withstand the radial loads or forces that are perpendicular to rotor shaft 74. Intermediate rotor bearing assembly further accommodates the rotation of rotor shaft 74 relative to stator 62. Looking at FIG. 4 intermediate rotor bearing assembly 76 includes rotor bearing housing 78. Rotor bearing housing 78 is located radially outward of intermediate radial bearing 80. Rotor bearing housing 78 supports intermediate radial bearing 80 within interior cavity 66 of stator 62. Oil transfer holes 82 extend axially through rotor bearing housing 78. Oil transfer holes provide for the flow of fluids, such as oil, axially through interior cavity 66 past rotor bearing housing 78.

Rotor assembly 72 further includes intermediate rotor member 84. Rotor member 84 circumscribes rotor shaft 74. During operation of motor 20, rotor member 84 rotates within motor housing 44. Rotor body 86 is a generally ring shaped member. Rotor assembly 72 can be a permanent magnet rotor and have permanent magnets spaced around or within rotor body 86. In alternate embodiments, rotor assembly 72 can be an induction rotor and have rotor windings spaced around or within rotor body 86.

Outer spacer 88 and intermediate spacer 90 can maintain the position of rotor assembly 72 and intermediate rotor bearing assembly 76 within interior cavity of 66 of stator 62. Outer spacer 88 and intermediate spacer 90 can each be a single ring or can be segmented members. Outer spacer 88 is located between rotor member 84 and bearing housing 92. Bearing housing 92 can be a ring shaped member that is secured to backup ring 58. In the example embodiment of FIG. 2 bearing housing 92 is secured to backup ring 58 with threaded member 94. Bearing housing 92 need not be sealingly secured to backup ring 58.

Bearing housing 92 can have inner end 96 that engages outer spacer 88 for maintaining the position of outer spacer 88 within stator 62. An intermediate spacer 90 can be located at one or both ends of intermediate rotor bearing assembly 76 between successive rotor members 84.

End bearing 98 can circumscribe rotor shaft 74. End bearing 98 can be a radial bearing able to withstand the radial loads or forces that are perpendicular to rotor shaft 74 and accommodate the rotation of rotor shaft 74 relative to bearing housing 92.

Liner 100 is located along an interior surface of interior cavity of 66 of stator 62. Liner 100 is secured indirectly to motor housing 44 by way of head member 50 and backup ring 58. Liner 100 can be directly secured to backup ring 58. An outer diameter surface of liner 100 is connected to backup ring 58 in a manner that prevents fluids from passing into the inner bore of motor housing 44 by traveling between liner 100 and backup ring 58. In the example embodiment of FIG. 2, liner 100 is welded to backup ring 58 with weld 102. In alternate embodiments, liner 100 can be connected to backup ring 58 in another manner known in the art that sealingly secures liner 100 to backup ring 58 such as, for example, with adhesive.

Stator 62 is hermetically sealed from fluids. Hermetically sealed space 104 is defined by motor housing 44, head member 50, backup ring 58, and liner 100. Because motor housing 44 is sealingly secured to head member 50, head member 50 is sealingly secured to backup ring 58, and backup ring 58 is sealingly secured to liner 100, fluids that are outside of hermetically sealed space 104 are prevented from reaching stator 62. In certain embodiments, hermetically sealed space 104 can be filled with a dielectric oil or can be solid filled to improve the heat transfer and mechanical integrity of the stator windings.

Liner 100 is a thin walled member. As an example, liner 100 can have a wall thickness in a range of 0.25 millimeters to 1.25 millimeters. In alternate examples liner 100 can have a wall thickness of about 0.5 millimeters. Liner 100 is formed of a non-magnetic material. Liner 100 can be formed, as an example, of steel, nickel alloy, thermoplastic, or glass fiber materials. In alternate embodiments liner 100 can be formed of stainless steel 316 or Inconnel 625® (a registered mark of Special Metals Corporation). Inconnel 625® provides the benefit of reduced electrical losses.

Figure 3:
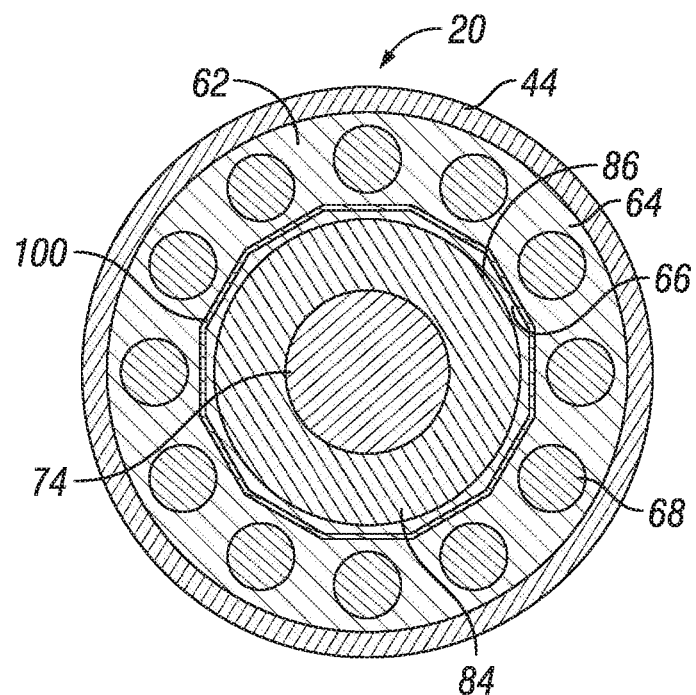
FIG. 3 is a cross section view along A-A of the electrical submersible pump assembly of FIG. 2.

Liner 100 has a polygonal cross section. In the Examiner of FIG. 3, the cross section of liner 100 has twelve sides. In alternate embodiments the cross section of liner 100 can have more or less than twelve sides. The greater the number of sides of liner 100, the closer the cross section of liner 100 resembles a circle instead of a polygon. The more liner 100 resembles a circle, the more efficient motor 20 will operate as the gap between stator 62 and rotor body 86 becomes more consistent and can be reduced.

Decreasing the number of sides of liner 100 can improve the ability of liner 100 to prevent rotation of rotor bearing housing 78 relative to stator 62. In some currently available motor assemblies, intermediate bearing housings are prone to rotate within the stator inner diameter, which can lead to heating and failure of the bearing as well as wear of the stator laminations. Looking at FIG. 4, intermediate rotor bearing assembly 76 has a polygonal shaped outer diameter surface such as outer series of edges 106 that corresponds to the polygonal cross section of liner 100. The inner diameter shape of intermediate rotor bearing assembly 76 is defined by intermediate radial bearing 80. The inner diameter shape of intermediate radial bearing 80 corresponds to an outer diameter shape of rotor shaft 74. The interaction of the outer series of edges 106 of intermediate rotor bearing assembly 76 and the inner diameter surface of liner 100 results in intermediate rotor bearing assembly 76 being rotationally static relative to stator 62 while rotor shaft 74 rotates relative to intermediate rotor bearing assembly 76.

Embodiments of this disclosure can prevent rotation of rotor bearing housing 78 relative to stator 62 while maintaining a simple workbench assembly process of motor 20, and is particular useful for long and skinny motors. In order to assemble motor 20 intermediate rotor bearing assembly 76 and rotor member 84 can be positioned around and circumscribe rotor shaft 74 to form rotor assembly 72. Stator body 64 can be positioned within motor housing 44. Head member 50 can be sealingly connected to motor housing 44 and motor tails 56 can be made up with stator wire overhang 108. Backup ring 58 can be sealingly connected to head member 50 and liner 100 can be sealingly connected to backup ring 58 to form a hermetically sealed space 104 that contains stator 62.

Rotor assembly 72 can then be pulled into interior cavity 66 of stator body 64 within motor housing 44. Outer series of edges 106 of intermediate rotor bearing assembly 76 can engage the inner diameter surface of liner 100 as rotor assembly 72 is pulled into motor housing 44. The polygonal shape of outer series of edges 106 and inner diameter surface of liner 100 allows rotor assembly 72 to be pulled into motor housing 44 with little resistance and prevents intermediate rotor bearing assembly 76 from rotating relative to motor housing 44. Bearing housing 92 can be secured to backup ring 58 to maintain rotor assembly 72 within motor housing 44.

Motor 20 can be made up with seal section 22 and pump 18 to form electrical submersible pump assembly 16. Electrical submersible pump assembly 16 can then be lowered into subterranean well 10 with deployment string 38. Electrical submersible pump assembly 16 can then be operated to lift production fluids in a direction out of subterranean well 10. If motor 20 requires repair or maintenance, rotor assembly 72 can be pulled out of motor housing 44 in a reverse series of steps.

Embodiments of this disclosure therefore provide systems and methods for hermetically sealing a stator for providing a greater motor life and reduced needs for servicing the motor. Having a rotor cavity that is separate from the stator allows for alternative lubricating or cooling oils to be used in the rotor cavity and seal section without the risk of such fluids degrading the stator.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for producing hydrocarbons from a subterranean well, the system including:
    an electrical submersible pump assembly with a motor, where the motor has:
        a motor housing, the motor housing being an elongated member;
        a stator located within the motor housing, the stator having a stator body with an interior cavity extending along a central axis of the stator;
        a rotor assembly located within the interior cavity of the stator, the rotor assembly including a rotor shaft, a rotor member, and an intermediate rotor bearing assembly, where the rotor member and the intermediate rotor bearing assembly circumscribe the rotor shaft, and where the rotor shaft is an elongated member that extends along the central axis of the stator; and
        a liner located along an interior surface of the interior cavity, the liner being a thin walled member that is secured to the motor housing and seals the stator body from a wellbore fluid; where
        the liner located along the interior surface of the interior cavity having a polygonal cross section perpendicular to the central axis:
        the intermediate rotor bearing assembly is a ring shaped member with an outer diameter surface, the outer diameter surface having a polygonal shaped outer series of edges that corresponds to the polygonal cross section of the liner; and
        an interaction of the outer series of edges of the intermediate rotor bearing assembly and the inner diameter surface of the liner results in the intermediate rotor bearing assembly being rotationally static relative to the stator while the rotor shaft rotates relative to the intermediate rotor bearing assembly.

2. The system of claim 1, where the intermediate rotor bearing assembly has a radial bearing having an inner diameter shape that corresponds to an outer diameter shape of the rotor shaft.

3. The system of claim 1, where the liner is formed of a non-magnetic material.

4. The system of claim 1, where the liner is welded at an uphole end of the motor and is welded at a downhole end of the motor.

5. The system of claim 1, where the motor has an axial length in a range of 0.050 to 10 meters and has an outer diameter in a range of 0.025 to 1 meters.

6. A method for producing hydrocarbons from a subterranean well, the method including:
    providing the system of claim 1;
    lowering the electrical submersible pump assembly into the subterranean well with a deployment string;
    operating the electrical submersible pump assembly to lift the wellbore fluids in a direction out of the subterranean well.

7. The method of claim 6, further including providing the intermediate rotor bearing assembly with a radial bearing having an inner diameter shape that corresponds to an outer diameter shape of the rotor shaft.

8. The method of claim 6, where the liner is formed of a non-magnetic material.

9. The method of claim 6, where the liner is welded at an uphole end of the motor and is welded at a downhole end of the motor.

10. The method of claim 6, where the motor has an axial length in a range of 0.050 to 10 meters and has an outer diameter in a range of 0.025 to 1 meters.

11. A method for producing hydrocarbons from a subterranean well, the method including:
    forming a rotor assembly by positioning an intermediate rotor bearing assembly and a rotor member onto a rotor shaft so that the rotor member and the intermediate rotor bearing assembly circumscribe the rotor shaft, where the rotor shaft is an elongated member;
    pulling the rotor assembly into an interior cavity of a stator body within a motor housing, the motor housing being an elongated member and the stator body being part of a stator, where the rotor shaft extends along a central axis of the stator, where a liner is located along an interior surface of the interior cavity, the liner being a thin walled member that is secured to the motor housing and sealing the stator body from a wellbore fluid, the liner located along the interior surface of the interior cavity having a polygonal cross section perpendicular to the central axis, and where the motor housing, the stator, the rotor assembly, and the liner form a motor;
    forming an electrical submersible pump assembly with the motor, a seal section, and a pump;
    lowering the electrical submersible pump assembly into the subterranean well with a deployment string;
    operating the electrical submersible pump assembly to lift production the wellbore fluids in a direction out of the subterranean well; where
    the intermediate rotor bearing assembly is a ring shaped member with an outer diameter surface, the outer diameter surface having a polygonal shaped outer series of edges that corresponds to the polygonal cross section of the liner; and
    an interaction of the outer series of edges of the intermediate rotor bearing assembly and the inner diameter surface of the liner results in the intermediate rotor bearing assembly being rotationally static relative to the stator while the rotor shaft rotates relative to the intermediate rotor bearing assembly.

12. The method of claim 11, further including providing the intermediate rotor bearing assembly with a radial bearing having an inner diameter shape that corresponds to an outer diameter shape of the rotor shaft.

13. The method of claim 11, where the liner is formed of a non-magnetic material.

14. The method of claim 11, where the liner is welded at an uphole end of the motor and is welded at a downhole end of the motor.

15. The method of claim 11, where the motor has an axial length in a range of 0.050 to 10 meters and has an outer diameter in a range of 0.025 to 1 meters.

* * * * *